United States Patent [19]

Koda et al.

[11] Patent Number: 4,635,146

[45] Date of Patent: Jan. 6, 1987

[54] REEL BRAKE AND ASSOCIATED TENSION ARM CONTROL DEVICE FOR A REVERSIBLE TAPE RECORDING AND/OR REPRODUCING APPARATUS

[75] Inventors: Kazuo Koda; Jun Etoh, both of Yokohama, Japan

[73] Assignee: Victor Company of Japan, Ltd., Yokohama, Japan

[21] Appl. No.: 591,477

[22] Filed: Mar. 20, 1984

[30] Foreign Application Priority Data

Mar. 22, 1983 [JP] Japan ............................ 58-41146[U]

[51] Int. Cl.$^4$ ...................... G11B 5/027; G11B 5/008; G11B 15/00; G11B 17/00
[52] U.S. Cl. .................................... 360/85; 360/96.3
[58] Field of Search ................... 360/83, 84, 85, 95, 360/96.3

[56] References Cited

U.S. PATENT DOCUMENTS

| 4,121,267 | 10/1978 | Hayashi | 360/85 |
| 4,499,513 | 2/1985 | Umeda | 360/85 |

FOREIGN PATENT DOCUMENTS

| 0057921 | 8/1982 | European Pat. Off. . | |
| 0087952 | 9/1983 | European Pat. Off. . | |
| 3308110 | 9/1983 | Fed. Rep. of Germany . | |
| 2078431 | 1/1982 | United Kingdom | 360/85 |
| 2094542 | 9/1982 | United Kingdom . | |

Primary Examiner—Robert S. Tupper
Assistant Examiner—Melissa J. Koval
Attorney, Agent, or Firm—Michael N. Meller

[57] ABSTRACT

An automatic tape loading type recording and/or reproducing apparatus comprises a mechanism for loading a tape in a predetermined path in which the tape makes contact with a guide drum by intercepting and drawing the tape out of the tape cassette, a mechanism for moving the tape in the predetermined path in forward and reverse directions depending on a mode of the apparatus, a tension control mechanism for controlling a tension in the tape and comprising a tension arm and a braking member which acts on a supply reel disc, a cam mechanism for operating a braking system which is provided with respect to supply and take-up reel discs and comprising a cam body which rotates in response to the mode of the apparatus, a cam controlling mechanism responsive to a reverse reproduction mode of the apparatus, for rotating the cam body to a predetermined rotational position which is different from a rotational position of the cam body during a normal recording or reproducing mode of the apparatus, and a mechanism operated in response to the rotation of the cam body to the predetermined rotational position, for causing the tension control mechanism to assume an inoperative state by rotating the tension arm in a predetermined direction so that the braking member becomes inoperative with respect to the supply reel disc.

4 Claims, 5 Drawing Figures

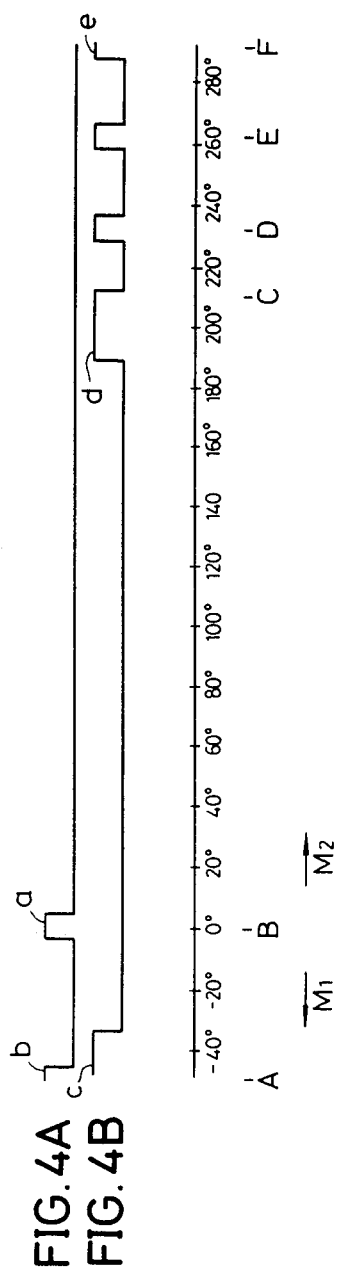

REEL BRAKE AND ASSOCIATED TENSION ARM CONTROL DEVICE FOR A REVERSIBLE TAPE RECORDING AND/OR REPRODUCING APPARATUS

BACKGROUND OF THE INVENTION

The present invention generally relates to automatic tape loading type recording and/or reproducing apparatuses, and more particularly to an automatic tape loading type recording and/or reproducing apparatus which is capable of carrying out a so-called reverse reproduction in which a tape moves in a reverse direction along a path in which the tape is loaded.

Recently, the use of a recording and/or reproducing apparatus has become popular. In the popular recording and/or reproducing apparatus, a tape is drawn out of a tape cassette which is loaded in the apparatus, and is then loaded in a predetermined path so as to make contact with a guide drum. A signal is recorded on or reproduced from the tape which is in this predetermined path, in a state where the tape is moved in a forward direction. In the above apparatus, the tape is automatically loaded in the predetermined path, and for this reason, the apparatus is referred to as an automatic tape loading type recording and/or reproducing apparatus. In addition to carrying out normal recording and reproducing operations in which the tape is moved in the forward direction along the predetermined path, some of the automatic tape loading type recording and/or reproducing apparatuses are designed to also carry out a reverse reproducing operation in which the tape is moved in a reverse direction along the predetermined path. When the tape is moved in the reverse direction along the predetermined path, a supply reel disc for rotating a supply reel of the tape cassette is rotated in a tape take-up direction so as to take-up the tape. In this state, it becomes necessary to cancel the braking with respect to the supply reel disc, which braking is originally applied to the supply reel disc to control the tension in the tape, mainly for the purpose of reducing the rotational resistance of the supply reel disc. Conventionally, a plunger was used for cancelling this braking with respect to the supply reel disc. However, the use of the plunger introduced a limit to the reduction of the overall size and weight of the apparatus.

SUMMARY OF THE INVENTION

Accordingly, it is a general object of the present invention to provide a novel and useful automatic tape loading type recording and/or reproducing apparatus in which the problems described heretofore have been eliminated.

Another and more specific object of the present invention is to provide an automatic tape loading type recording and/or reproducing apparatus which is designed to set a supply side tension control mechanism in an inoperative state by using the movement of an existing control member which controls a reel disc braking system to a state which corresponds to a mode which has been set, every time the mode of the apparatus is set.

According to the apparatus of the present invention, it is unnecessary to provide a plunger which was conventionally required to set the tension control mechanism in the inoperative state so as to cancel the braking force which acts on the supply reel disc for the purpose of controlling the tension in a tape. Thus, the overall size and weight of the apparatus can be effectively reduced according to the present invention, and further, the manufacturing cost of the apparatus can be reduced. Further, because the apparatus is designed to set the tension control mechanism in the inoperative state by use of the existing control member, it is unnecessary to provide an additional control member exclusively for the purpose of setting the tension control mechanism in the inoperative state, and the number of parts which must be additionally provided in the apparatus is kept to a minimum.

Other objects and further features of the present invention will be apparent from the following detailed description when read in conjunction with the accompanying drawings.

BRIEF DESCRIPTION OF THE DRAWINGS

FIGS. 4A and 4B respectively show output signal waveforms of an inner sensor and an outer sensor which determine the rotational position of a cam gear, in correspondence with the rotational angle of the cam gear in each of the modes.

DETAILED DESCRIPTION

Figure 1:
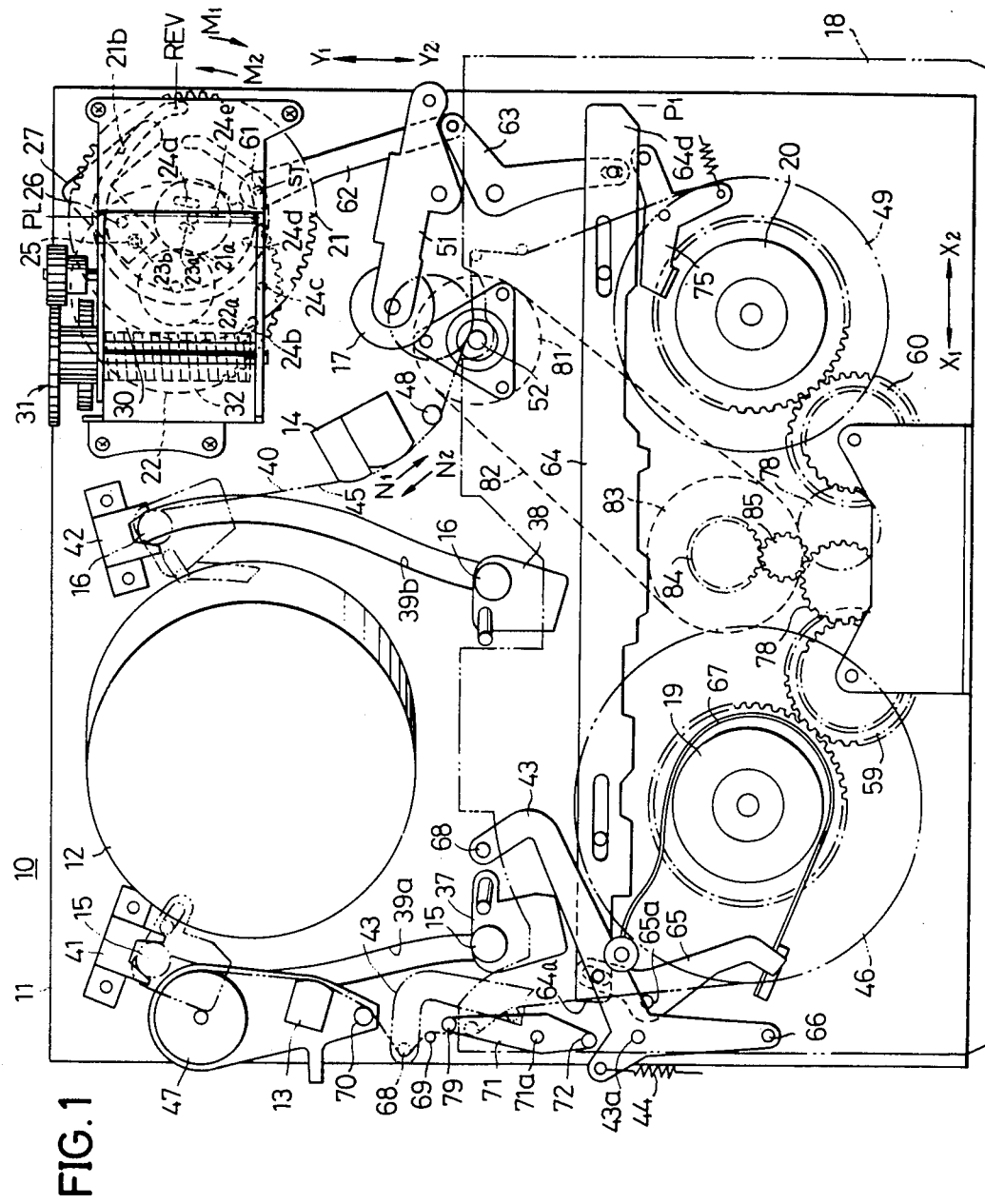
FIG. 1 is a plan view showing an embodiment of an automatic tape loading type recording and/or reproducing apparatus according to the present invention in a stop mode.

As shown in FIG. 1, an automatic tape loading type recording and/or reproducing apparatus 10 comprises a chassis 11. A guide drum 12, a full-width erasing head 13, an audio and control head 14, and the like are disposed on the chassis 11. The guide drum 12 consists of an upper rotary drum which has one or a plurality of rotary video heads, and a lower stationary drum. In the present embodiment, description will be given with respect to a case where the upper rotary drum has a plurality of rotary video heads. In a stop mode of the apparatus 10, loading poles 15 and 16 and a pinch roller 17 assume respective positions which are indicated by solid lines in FIG. 1. As indicated by a two-dot chain line in FIG. 1, a tape cassette 18 is loaded in the apparatus 10 in a state where reels (not shown) inside the tape cassette 18 are respectively fitted over a supply reel disc 19 and a take-up reel disc 20.

As will be described later on in the specification, a reel disc braking system, a reel disc driving system, and the pinch roller 17 of the apparatus 10, are operated by a cam gear 21 according to each mode of the apparatus 10.

Figure 2:
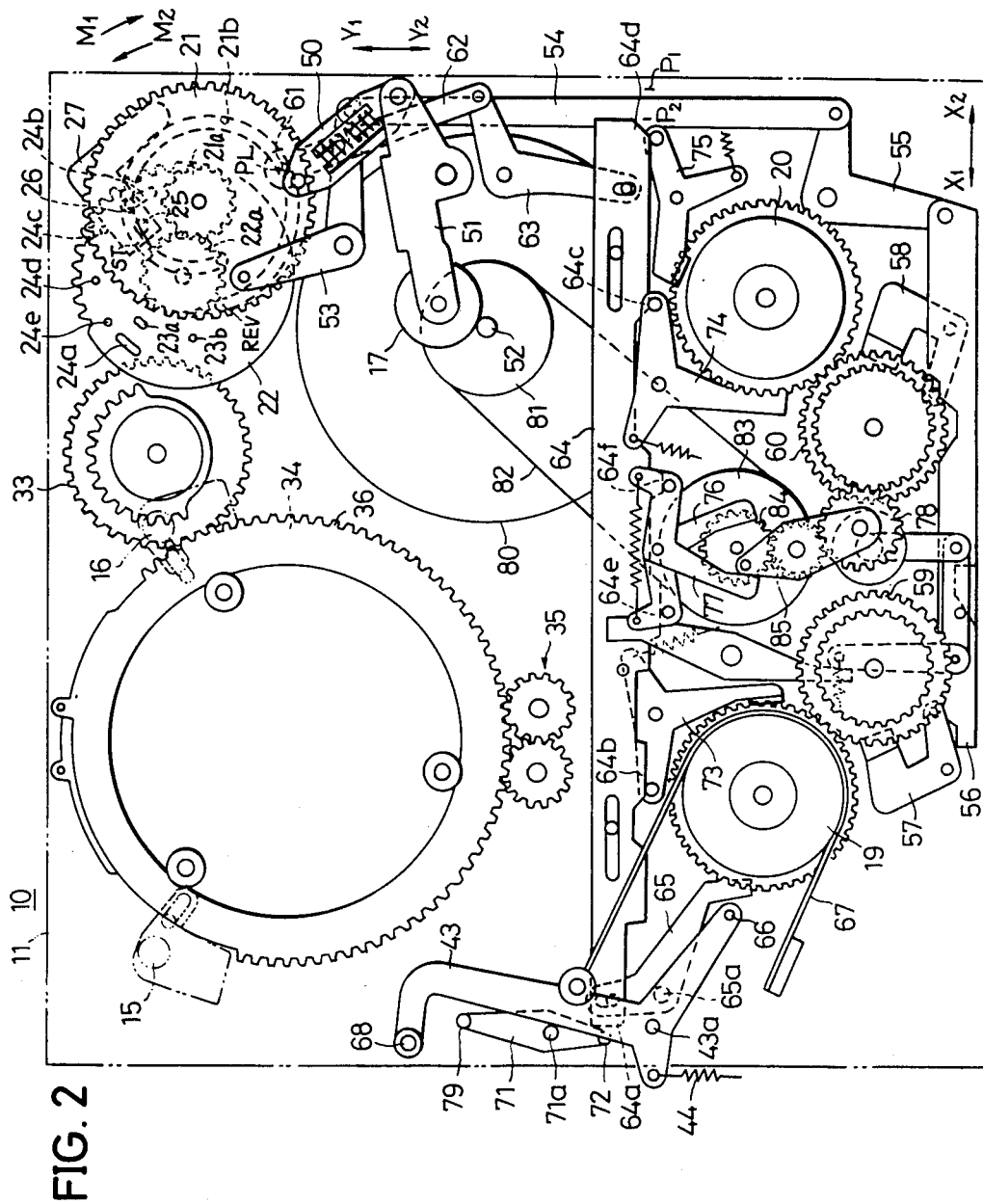
FIG. 2 is a plan view, with a chassis of the recording and/or reproducing apparatus omitted, showing the operating states of a tape loading mechanism, a reel disc driving system, and a reel disc braking system of the recording and/or reproducing apparatus in a recording or reproducing mode.

As shown in FIG. 2, a gear part 21a is integrally formed on the cam gear 21, and a gear part 22a is integrally formed on a detecting gear 22. The gear part 21a of the cam gear 21 and the gear part 22a of the detecting gear 22 mesh with each other, and the gears 21 and 22 rotate in mutually opposite direction with respect to each other. The cam gear 21 comprises a substantially spiral-shaped cam groove 21b, and the like. Detecting holes 23a and 23b are formed at predetermined positions on an inner imaginary circle located at an inner peripheral part of the detecting gear 22. Further, detecting holes 24a, 24b, 24c, 24d, and 24e are formed at predetermined positions on an outer imaginary circle located at an outer peripheral part of the detecting gear 22. An inner sensor 25 and an outer sensor 26 are respectively mounted on a support plate 27 which is fixed to the chassis 11, so that the inner sensor 25 opposes the inner imaginary circle and the outer sensor 26 opposes the outer imaginary circle. The sensors 25 and 26 detect the rotational angular position of the detecting gear 22, that is, the rotational angular position of the cam gear 21, by detecting the detecting holes in the detecting gear 22. These sensors 25 and 26 produce signals responsive to the detected holes. The output signal waveforms of the sensors 25 and 26 when the detecting gear 22 is rotated, are respectively shown in FIGS. 4A and 4B.

In a stop mode of the apparatus 10, the cam gear 21 assumes a reference position shown in FIG. 1. The reference position corresponds to a position B shown in FIG. 4. In this state, the inner sensor 25 detects the detecting hole 23b, and produces a signal a.

When the apparatus 10 is operated to carry out a fast-forward or rewind operation, the cam gear 21 rotates in the direction of arrow $M_1$ from the reference position, up to a rotational position where the sensors 25 and 26 respectively detect the detecting holes 23a and 24a and produce signals b and c. The cam gear 21 rotates over an angle of approximately 50°, for example, from the reference position, and stops at a position A shown in FIG. 4.

When the apparatus 10 is operated in the stop mode so as to carry out a recording or reproducing operation, the cam gear 21 rotates in the direction of arrow $M_2$ from the reference position, up to a rotational position where the sensor 26 detects the detecting hole 24b as shown in FIG. 2 and produces a signal d shown in FIG. 4B. The cam gear 21 rotates over an angle of approximately 210°, for example, from the reference position, and stops at a position C shown in FIG. 4.

In a case where the apparatus 10 is operated to carry out a reverse reproduction in the recording or reproducing mode, the cam gear 21 further rotates in the direction of the arrow $M_2$ from the position C, up to a rotational position where the sensor 26 detects the detecting hole 24e and produces a signal e shown in FIG. 4B. The cam gear 21 rotates over an angle of approximately 80°, for example, from the position C, and stops at a position F shown in FIG. 4 after passing positions D and E.

Description will now be given with respect to a case where the apparatus 10 is operated to carry out a recording or reproducing operation in the stop mode. When the apparatus 10 is operated to carry out a recording or reproducing operation in the stop mode, a loading motor 30 starts to rotate. The loading motor 30 rotates the cam gear 21 through a gear mechanism 31 and a worm 32. Hence, the cam gear 21 rotates in the direction of the arrow $M_2$ up to the rotational position shown in FIG. 2. As the cam gear 21 rotates, a lower loading ring 34 is rotated clockwise through the detecting gear 22 and a duplex gear 33. Further, an upper loading gear 36 is rotated counterclockwise through a reversal gear mechanism 35.

As the loading rings 34 and 36 rotate, loading pole bases 37 and 38 move along respective guide grooves 39a and 39b on the chassis 11. As a result, the loading poles 15 and 16 intercept a magnetic tape 40, and draw the tape 40 out of the tape cassette 18. The loading pole bases 37 and 38 move to final positions where the poles 15 and 16 engage and push against respective stoppers 41 and 42. Following the above movement of the loading pole base 37, a tension arm 43 is rotated counterclockwise about a pin 43a by a spring 44 up to an intermediate position.

Accordingly, the tape 40 is loaded in a path 45 which is indicated by a two-dot chain line in FIG. 1. In other words, the tape 40 is drawn out from a supply tape reel 46, makes contact with the full-width erasing head 13, and then makes contact with an impedance roller 47. The tape 40 is further guided by the loading poles 15 and 16, and is wrapped obliquely around the peripheral surface of the guide drum 12. Then, the tape 40 makes contact with the audio and control head 14 and a guide roller 48, and enters within the tape cassette 18 so as to be taken up by a take-up tape reel 49.

As the cam gear 21 rotates, an arm 50 is moved substantially in the direction of an arrow $Y_1$ by a cam (not shown), and an arm 51 rotates counterclockwise. Thus, the pinch roller 17 presses against a capstan 52.

In addition, as the cam gear 21 rotates, an arm 53 is rotated counterclockwise by a cam (not shown), and a slide plate 54 moves in the direction of an arrow $Y_2$. Further, a slide plate 56 is moved in the direction of an arrow $X_1$ through a link 55. Main brakes 57 and 58 are rotated as the slide plate 56 moves. The main brakes 57 and 58 thus separate from respective intermediate gears 59 and 60, and the main braking with respect to the reel discs 19 and 20 is cancelled. Moreover, as the cam gear 21 rotates, a pin 61 is guided by the cam groove 21b and moves from a position ST in the cam groove 21b to a position PL in the cam groove 21b. Hence, an arm 62 is pushed out substantially in the direction of the arrow $Y_2$, and a slide plate 64 is moved in the direction of the arrow $X_1$ from a position $P_1$ to a position $P_2$ through an L-shaped rotary arm 63.

Due to the above movement of the slide plate 64, an arm 65 rotates counterclockwise about a pin 65a, and the locking engagement with respect to a pin 66 of the tension arm 43 is released. Thus, the tension arm 43 is rotated counterclockwise by the spring 44 up to a position which is shown in FIG. 2 and is indicated by a two-dot chain line in FIG. 1, and a brake band 67 becomes tense. In addition, a tension pole 68 located at the tip end of the tension arm 43 makes contact with the tape 40, between tape guide poles 69 and 70. Therefore, the tension control mechanism assumes an operative state.

A tip end part 64a of the slide plate 64 is positioned in the vicinity of a pin 72 which is located at one end of a shift arm 71.

Loading brakes 73 and 74 apply a back tension to the tape 40 which is drawn out of the tape cassette 18 during the tape loading operation. Due to the movement of the slide plate 64 described before, the loading brakes 73 and 74 are rotated by the actions of respective cam parts 64b and 64c of the slide plate 64, and the loading brakes 73 and 74 thus separate from the respective reel discs 19 and 20. In addition, a search brake 75 remains separated from the reel disc 20 due to the action of a cam part 64d of the slide plate 64. Moreover, a pair of L-shaped arms 76 and 77 are engaged by cam parts 64e and 64f of the slide plate 64, and assume open states. Hence, an idler gear 78 becomes swingable in this state.

A capstan motor 80 rotates in a forward direction, that is, clockwise, and rotates a drum motor (not shown).

The motor 80 rotates a gear 85 counterclockwise, through a pulley 81, a belt 82, a pulley 83, and a gear 84. As the gear 85 rotates, the idler gear 78 swings counterclockwise and couples with the intermediate gear 60. Accordingly, the reel disc 20 is rotated in the tape take-up direction. The capstan 52 is rotated clockwise. As a result, the tape 40 is driven in a state pinched between the pinch roller 17 and the capstan 52, and is moved in the direction of an arrow $N_1$ along the path 45. A video signal is recorded on or reproduced from the tape 40 by rotary video heads, while the tape 40 makes contact with the guide drum 12. The apparatus 10 assumes a normal recording or reproducing mode in this state.

Figure 3:
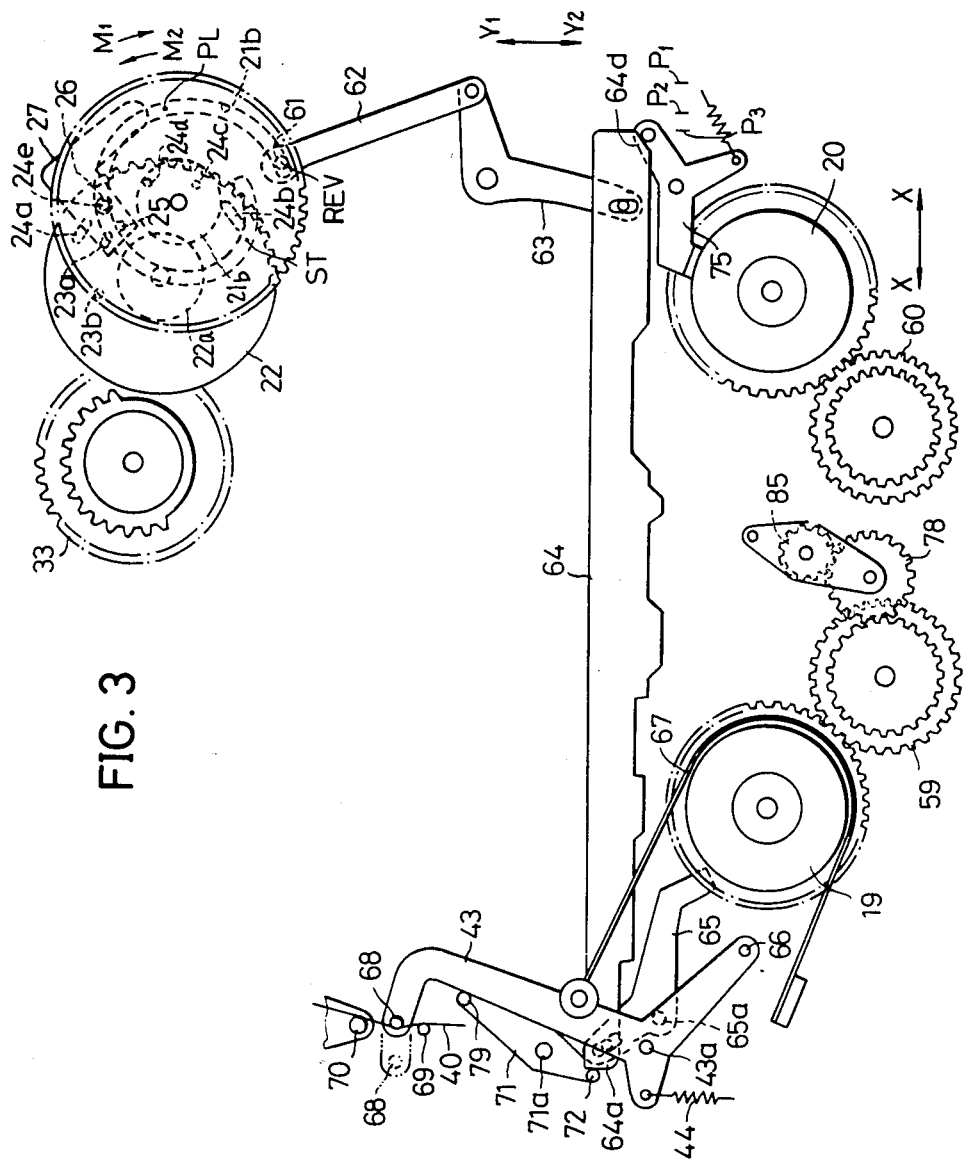
FIG. 3 shows the state of the reel disc braking system and the reel disc driving system in a reverse reproduction mode.

When the apparatus 10 is operated to carry out a reverse reproduction during the normal recording or reproducing mode, the cam gear 21 is further rotated in the direction of the arrow $M_2$ over an angle of approximately 80°, for example, and the pin 61 is guided to a position REV in the cam groove 21a as shown in FIG. 3. Due to the above further rotation of the cam gear 21, the arm 62 is further pushed out substantially in the direction of the arrow $Y_2$, and the slide plate 64 is further moved in the direction of the arrow $X_1$ up to a position $P_3$ shown in FIG. 3. In other words, the slide plate 64 undergoes continuous movement in a direction which is the same as the moving direction of the slide plate 64 at the time when the mode of the apparatus 10 is set to the normal recording or reproducing mode. As the cam gear 21 undergoes the further rotation, the duplex gear 33 remains stationary, and for this reason, the tape loading mechanism remains in the state shown in FIG. 2.

Due to the above continuous movement of the slide plate 64, the tip end part 64a of the slide plate pushes the pin 72, and the shift arm 71 rotates clockwise about a pin 71a, as shown in FIG. 3. A pin 79 provided on the other end of the arm 71, pushes the tension arm 43. Accordingly, the tension arm 43 rotates slightly clockwise against the force exerted by the spring 44, that is, rotates slightly in a returning direction. As a result, the brake band 67 slackens, and the braking of the supply reel disc 19 by the brake band 67 is cancelled.

Further, the cam part 64d of the slide plate 64 separates from the search brake 75, and the search brake 75 acts on the take-up reel disc 20. The loading brakes 73 and 74 and the L-shaped arms 76 and 77 are respectively maintained in the state shown in FIG. 2.

In addition, the capstan motor 80 rotates in a reverse direction, that is, counterclockwise. Thus, the capstan 52 rotates counterclockwise and the gear 85 rotates clockwise. The idler gear 78 swings clockwise and couples with the intermediate gear 59, and the supply reel disc 19 rotates in the tape take-up direction.

Therefore, the tape 40 is driven in a state pinched between the pinch roller 17 and the capstan 52, and is moved along the path 45 in a reverse direction which is indicated by an arrow $N_2$. The tape 40 which moves in the direction of the arrow $N_2$ is taken up by the supply tape roll 46. The recorded video signal is reproduced from the tape 40 by the rotary video heads, while the tape 40 makes contact with the guide drum 12. The apparatus 10 assumes a reverse reproduction mode in this state.

During the reverse reproduction mode, the tape 40 is drawn out of the take-up tape roll 49 in a state where a tension is applied to the tape 40 due to the action of the search brake 75. Further, due to the slight clockwise rotation of the tension arm 43, the angle over which the tape 40 is wrapped around the tension pole 68 is decreased, and for this reason, the load on the moving tape 40 is reduced at this position.

In a case where the apparatus 10 is operated in the normal recording or reproducing mode or the reverse reproduction mode, so as to change the mode of the apparatus 10 to the stop mode, the cam gear 21 rotates in the direction of the arrow $M_1$ up to the position shown in FIG. 1. A tape unloading operation is performed in response to this rotation of the cam gear 21 in the direction of the arrow $M_1$, and the apparatus 10 thus assumes the stop mode shown in FIG. 1. In an initial stage in which the cam gear 21 rotates, the slide plate 64 moves in the direction of the arrow $X_2$ due to the action of the cam groove 21b, and the arm 65 rotates clockwise. The tension arm 43 is engaged by the arm 65 and rotates clockwise, and assumes a state where the tension arm 43 is engageable by the loading pole base 37 which returns.

Further, the present invention is not limited to the embodiment described heretofore, but various variations and modifications may be made without departing from the scope of the present invention.

What is claimed is:

1. A reel brake and associated tension arm control device for a reversible tape recording and/or reproducing apparatus which has a stop mode, a forward recording or reproduction mode and a reverse reproduction mode, said reversible tape recording and/or reproducing apparatus comprising a guide drum having at least one head for recording an/or reproducing a signal on and/or from a tape, supply and take-up reel discs engageable with a tape cassette which is loaded in said apparatus, tape guiding means for guiding said tape in a predetermined path in which said tape extends out of said tape cassette and makes contact with said guide drum, driving means for driving said tape in said predetermined path so that said tape moves in a forward direction during said forward recording or reproduction mode and in a reverse direction during said reverse reproduction mode, and braking means for braking said supply and take-up reel discs so that said tape stops during said stop mode, said reel brake and associated tension arm control device comprising:

a tension control mechanism for controlling a tension in said tape, said tension control mechanism comprising a rotary tension arm biased in one direction for making contact with said tape at a tip end of said tension arm and for applying a pressure to said tape at a tension-applied position, and a supply reel disc braking member formed as a part of said braking means for braking said supply reel disc, said supply disc braking member being connected to said tension arm;

a rotary cam body which rotates to first, second and third rotational positions when said reversible tape recording and/or reproducing apparatus assumes said stop mode, said forward recording or reproduction mode and said reverse reproduction mode, respectively; and cam and link means engageable with said tension arm and undergoing a displacement responsive to a rotation of said rotary cam body, said cam and link means undergoing a displacement from a first position to a second position when said rotary cam body rotates from said first rotational position to said second rotational position, in response to which said tension arm is displaced in said one direction to said tension-applied position and said supply reel disc braking member is tensioned, said cam and link means undergoing a further displacement from said second position to a third position when said rotary cam body rotates from said second rotational position to said third rotational position, in response to which said tension arm is displaced in the other direction from said tension-applied position to a predetermined recessed position whereby said supply reel disc braking member is simultaneously released from the supply reel disc.

2. A reel brake and associated tension arm control device as claimed in claim 1, in which said cam and link means comprises a slide plate for undergoing a displacement in a predetermined direction when said rotary cam body rotates from said first rotational position to said second rotational position, said slide plate undergoing a further displacement in said predetermined direction when said rotary cam body rotates from said second rotational position to said third rotational position, and a first rotary arm member engaging and rotated by said slide plate for pushing said tension arm in said other direction to said predetermined recessed position when said slide plate undergoes said further displacement.

3. A reel brake and associated tension arm control device as claimed in claim 2, in which said cam and link means further comprises a second rotary arm member engageable with said slide plate and with said tension arm, and said tension control mechanism further comprises a biasing means for biasing said tension arm in one direction, said second rotary arm member engaging said tension arm for keeping said tension arm from being moved in said one direction by said biasing means when said cam and link means are at said first position, and disengaging said tension arm for allowing said tension arm to be urged by said biasing means whereby said tension arm reaches said tension-applied position when said cam and link means are at said second position.

4. A reel brake and associated tension arm control device as claimed in claim 2 in which said tape cassette comprises supply and take-up tape reels, said apparatus further comprises a take-up reel disc braking member for braking said take-up reel disc to apply a back tension to said tape which is drawn out of said take-up tape reel during the reverse reproduction mode, and said slide plate comprises a cam part for causing said take-up reel disc braking member to assume an operative state when said slide plate undergoes the further displacement.

* * * * *